(No Model.)
J. CHALEFOU.
DETACHABLE SPOUT AND CAN OPENER.
No. 547,370. Patented Oct. 1, 1895.
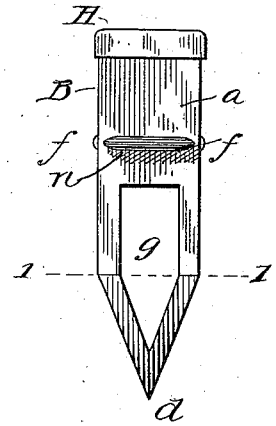
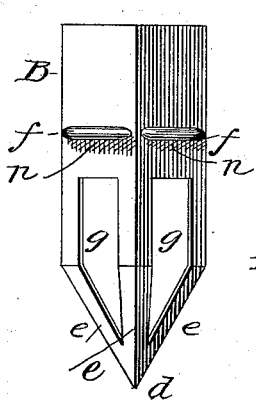
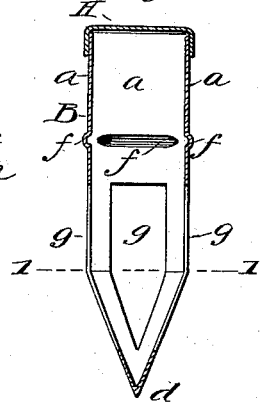
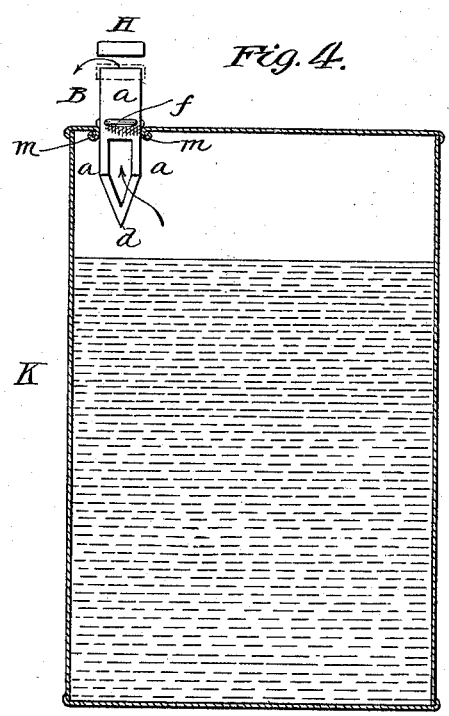
WITNESSES:
Frank L. Ober
Chas. E. Peters
INVENTOR
Jeannette Chalefou
BY
Winton C. Down
ATTORNEY

UNITED STATES PATENT OFFICE.

JEANNETTE CHALEFOU, OF BROOKLYN, NEW YORK.

DETACHABLE SPOUT AND CAN-OPENER.

SPECIFICATION forming part of Letters Patent No. 547,370, dated October 1, 1895.

Application filed February 7, 1895. Serial No. 537,585. (No model.)

*To all whom it may concern:*

Be it known that I, JEANNETTE CHALEFOU, a citizen of the United States, residing at Brooklyn, in the county of Kings and State of New York, have invented certain new and useful Improvements in Detachable Spouts and Can-Openers; and I do hereby declare the following to be a full, clear, and exact description of the invention, such as will enable others skilled in the art to which it appertains to make and use the same.

My invention relates to improvements in devices for opening sealed cans, &c., particularly condensed-milk cans, and which are adapted to serve as detachable spouts for emptying and delivering the contents after the opening is made, and remain in the can temporarily to keep the opening closed, prevent evaporation, and the entrance of dust, insects, &c. Devices heretofore contrived for this purpose have operated by cutting a disk or piece out of the can; but owing to the difficulty of getting this disk out of the device and its liability to fall or be driven into the can, thereby obstructing the outflow of the milk, they have not proved successful.

The object of my invention is to provide a device which when driven into the can will divide the metal and turn it back out of the way, thereby allowing a free passage for the milk into the spout portion of the device; and it consists of a detachable spout and can-opener composed of a hollow tubular body, forming the upper or spout portion of the device, and a tapered and pointed lower part, forming the puncturing portion, the sides of the device in their lower parts being provided with openings for the passage of the milk from the can into the spout.

In the accompanying drawings, Figure 1 represents a side elevation of my removable spout and can-opener; Fig. 2, an edge view of the same; Fig. 3, a vertical transverse section of the same, and Fig. 4 a sectional view of a can with the device inserted therein.

Referring to the drawings, the device comprises a hollow or tubular rectangular or other suitably shaped body B, the sides $a$ of which at a point on the line 1 1 begin to converge and terminate in a sharp point $d$. The meeting edges of the converging sides form sharp cutting-edges $e$, which readily and easily cut the metal as the device is driven in the can. At a suitable distance from the top of the body ribs $ffff$ are formed in any suitable way around the sides, which are for the purpose of regulating the distance the device can be driven into the can. The sides $a$, below the ribs a short distance, are provided with openings $g\ g\ g\ g$, which extend down into the converging sides. These openings are for the passage of the contents of the can into the spout or upper part B of the device. A suitable cap H is fitted over the top of the spout part B for the purpose of closing the spout and protecting the contents of the can in which the device is inserted against the entrance of dust, insects, &c.

The operation of the device is as follows: When a can K is to be opened, the point $d$ is placed on the thin portion of the top, near one edge, and holding the device upright, it is driven through the top until the ribs $f$ rest thereon. The metal which is displaced by the converging sides curls back from the opening, as indicated at $m$, Fig. 3; but when the straight sides above the line 1 1 pass into the opening there is sufficient elasticity in the curled-in lips to cause them to react against the sides of the device and hold it firmly in the opening and also make the joint tight enough to prevent leakage. When driven home, the opening being made, the device serves the purpose of a spout, by means of which the contents can be handily poured out into a cup, spoon, or other article.

To cause the device to take a securer hold of the can-top its sides at $n$ may be hatched or roughened like a file.

In a can of ordinary size the device should be inserted near one side, as shown in Fig. 3, for convenience in directing the milk into the receptacle; but it may be driven in at any other point.

The device may be made triangular, if desired, and it may be of any desired length or size suitable to the can or other receptacle with which it is used, and it is preferably made integral, with but one joint, or in any other convenient and suitable way, and from thin steel, so that the angular edges of the converging or tapered part may be made suitably sharp to cut the metal easily.

When the can is set aside, the top or cap H should be placed on the spout, and when the can is exhausted the spout should be removed and used with another can.

I claim—

1. As a new article of manufacture a detachable spout and can opener consisting of a tube having one end tapered to a point, the sides of the tapered portion placed at angles to each other with the meeting edges sharpened, and the lower part of the sides of the tube and the tapered portion provided with openings, substantially as specified.

2. A detachable spout and can opener consisting of a tubular upper end, and a tapered and pointed lower end, the sides of the tapered portion and a part of the tubular portion provided with openings, and the points where the sides of the tapered portion join formed with cutting edges, substantially as specified.

In testimony that I claim the invention above set forth I affix my signature in presence of two witnesses.

JEANNETTE CHALEFOU.

Witnesses:
FREDK. HAYNES,
CHAS. E. PETERS.